United States Patent
Sweeney et al.

(10) Patent No.: US 9,641,620 B2
(45) Date of Patent: May 2, 2017

(54) AUTOMATION AND PERSONALIZATION PLATFORM

(71) Applicant: Nortek Security & Control LLC, Carlsbad, CA (US)

(72) Inventors: Jeffrey Michael Sweeney, Carlsbad, CA (US); James J Haflinger, Carlsbad, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 0 days.

(21) Appl. No.: 15/130,445

(22) Filed: Apr. 15, 2016

(65) Prior Publication Data
US 2016/0308971 A1 Oct. 20, 2016

Related U.S. Application Data

(60) Provisional application No. 62/147,790, filed on Apr. 15, 2015.

(51) Int. Cl.
| | |
|---|---|
| *H04L 29/08* | (2006.01) |
| *G06K 19/07* | (2006.01) |
| *H04W 4/00* | (2009.01) |
| *H04L 12/28* | (2006.01) |
| *H04W 12/08* | (2009.01) |

(52) U.S. Cl.
CPC ............ *H04L 67/12* (2013.01); *G06K 19/072* (2013.01); *G06K 19/0705* (2013.01); *G06K 19/0707* (2013.01); *H04L 12/2803* (2013.01); *H04W 4/008* (2013.01); *H04W 12/08* (2013.01)

(58) Field of Classification Search
CPC .... H04L 67/12; H04L 12/2803; H04W 4/008; H04W 12/08; G06K 19/0705; G06K 19/0707; G06K 19/072
See application file for complete search history.

(56) References Cited

U.S. PATENT DOCUMENTS

| | | | |
|---|---|---|---|
| 6,624,752 B2 | 9/2003 | Klitsgaard et al. | |
| 8,917,716 B2 | 12/2014 | Tran | |
| 2010/0201520 A1* | 8/2010 | Stern | G01S 13/878 340/572.1 |
| 2013/0107041 A1 | 5/2013 | Norem et al. | |
| 2013/0127596 A1* | 5/2013 | Jain | G01S 13/74 340/10.1 |
| 2014/0266669 A1* | 9/2014 | Fadell | G05B 19/042 340/501 |
| 2015/0061859 A1 | 3/2015 | Matsuoka et al. | |

FOREIGN PATENT DOCUMENTS

WO  WO-2013185176 A1  12/2013

* cited by examiner

*Primary Examiner* — Leon Flores
(74) *Attorney, Agent, or Firm* — Schwegman Lundberg & Woessner, P.A.

(57) ABSTRACT

A system and method of using a combination of portable devices including wearable devices and tags and fixed devices including plug-in readers that are able to communicate using a short range wireless technology is described. The environment in which the fixed devices are disposed include residential, vehicle and commercial/work areas. The environment is able to detect the presence and absence of particular portable devices, determine whether personalized triggers exist and act accordingly based on information stored in a server or cloud-based storage. The actions in the environment include security, environmental controls, and alert transmission.

20 Claims, 3 Drawing Sheets

AUTOMATION AND PERSONALIZATION PLATFORM

PRIORITY CLAIM

This application claims the benefit of priority to U.S. Provisional Patent Application Ser. No. 62/147,790, filed Apr. 15, 2015, and entitled "AUTOMATION AND PERSONALIZATION PLATFORM," which is incorporated herein by reference in its entirety.

TECHNICAL FIELD

Embodiments pertain to connected lifestyles. Some embodiments relate to modules for the internet of things.

BACKGROUND

The use of networked electronics has increased in all areas of home and work life. For example, the popularity and ubiquity of smartphones and application usage has exploded over the last decade, in part fed by the increase in broadband and streaming usage. Wearable devices, in the form of smart watches have recently been gaining in popularity, with multiple manufacturers establishing communication links between the smart watches and corresponding smartphones. Other areas such as home/work automation and telematics have benefited from the use of connected devices and led to the promise of the Internet of Things. Despite the explosion of usage, however, issues remain with tracking and coordinating of electronic devices.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Some embodiments may incorporate structural, logical, electrical, process, and other changes. Portions and features of some embodiments may be included in, or substituted for, those of some embodiments. Embodiments set forth in the claims encompass all available equivalents of those claims.

Figure 1:
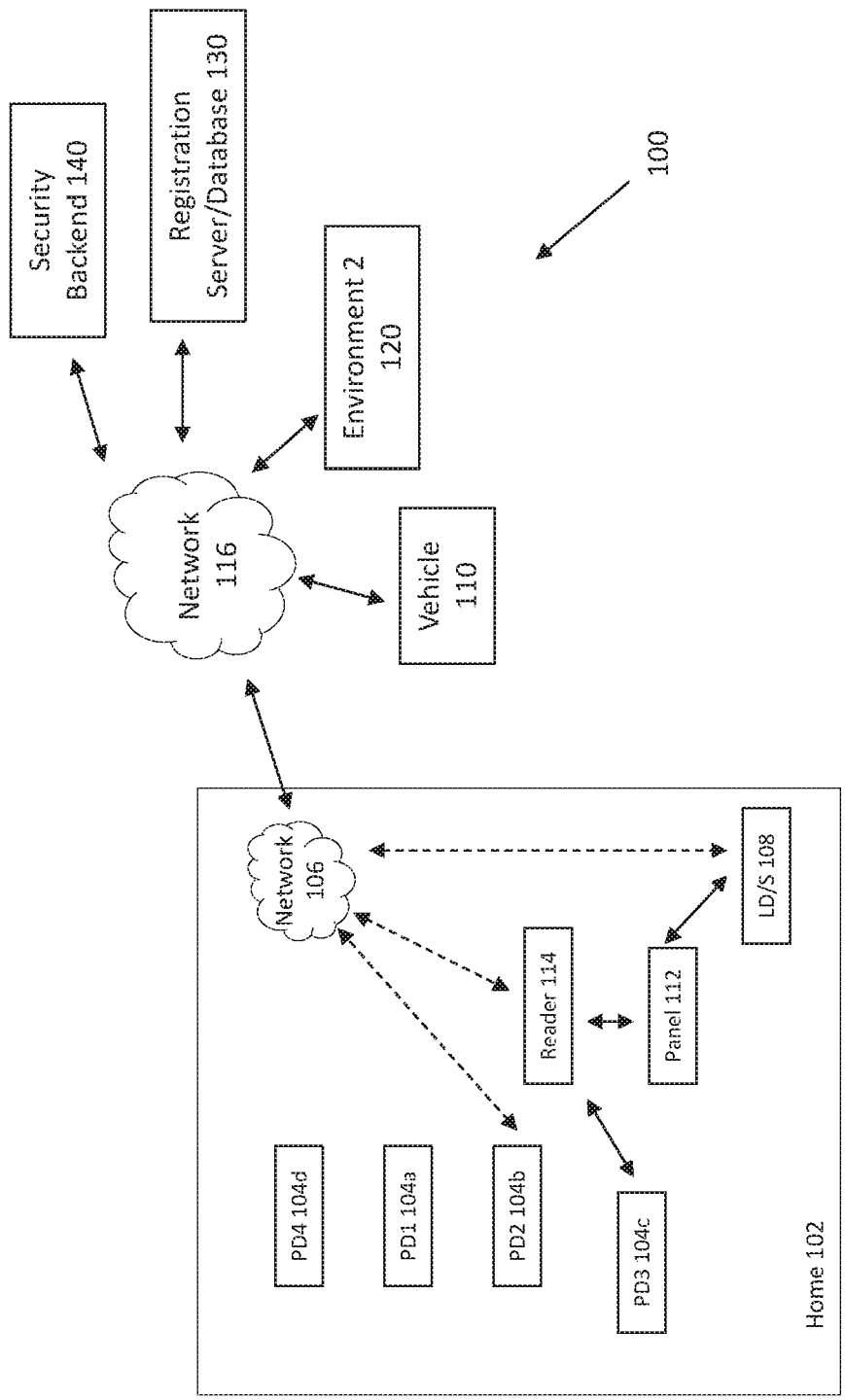
FIG. 1 illustrates a system in accordance with some embodiments.

FIG. 1 illustrates a system in accordance with some embodiments. The system 100 may contain a plurality of environments including a home (residential) environment 102, a vehicle 110, and another environment 120. The other environment may be a work environment such as an office building, a different home environment, a commercial environment such as for example a bricks-and-mortar store that the connected individual is visiting, a school or other educational institution, for example. The various environments 102, 110, 120 may be connected by one or more networks 116. The network 116 may be an external network, such as the internet or a private network. Communications may use 3rd Generation Partnership Project (3GPP) telecommunication devices, systems and technologies. Other equipment, such as base stations, routers, access points, gateways and the like used in communicating through the network 116 are not shown for convenience. The transmission through the network 116 may be encrypted or clear. In some cases, the data may be communicated through the network 116 using a virtual private network or other tunneling mechanism.

The home environment 102 may contain an internal network 106 through which various devices communicate using one or more of WiFi, Bluetooth, Zigbee, Z-Wave, infrared (IR), near field communication (NFC), 3GPP or other technologies. The home environment 302 may contain multiple portable devices 104a, 104b, 104c, 104d as well as one or more localized devices and/or systems 108 that remain in the home 102. The localized devices and/or systems 108 may be controlled, as below, dependent on which one or more of the portable devices 104a, 104b, 104c, 104d is present, and may communicate (as the other devices shown in the home) with the external network 116 directly and/or through an internal network 106. The localized devices or systems 108 may be controlled via a home control panel 112 that is in communication with readers 114 throughout the home 102. The readers 114 may be isolated or may form a mesh network to communicate with each other through various short-range communication technologies. The readers 114 are described in more detail below. One or more of the portable devices 104a, 104b, 104c, 104d may be able to determine its location via global positioning system (GPS), assisted-GPS, localization through access point determination, or other localization techniques, as discussed in more detail below. The internal network 106 may have a huh such as a security panel, router, or dedicated access point for communication with one or more of the portable devices 104a, 104b, 104c, 104d. Other devices may also be present, such as a general controller having a user interface to control the panel 112 and/or other devices in the home 102.

The portable devices 104a, 104b, 104c, 104d may include wearable devices configured to be worn by individuals (such as on a wrist, ankle or around a neck) and attachable tags for pets and objects. The tags may be fabricated using a durable material and designed with an integrated opening allowing for the tag to be added to a key ring, a pet collar or other such device. A short strap with a fastener may be included with the tag to allow the user to attach it to the handle of an item. A variation of the tag may allow for attachment to the zipper of a jacket for example. Each portable device 104a, 104b, 104c, 104d may both provide information and receive (gather and use) the information, depending on the information and the circumstances. The wearable devices may include smart watches, necklaces/lanyards, armbands/bracelets, leg bands, eyewear or clothing such as belts or smart clothing. For example, wearable bracelets and the tags may include an embedded Bluetooth Low Energy (BLE) sensor. The BLE sensor in the wearable bracelet may be able to communicate with, for example, a plug-in reader. One such plug-in may be a dual universal serial bus (USB) cigarette lighter plug-in adaptor with rechargeable batteries and BLE radio that is configured to be placed in the vehicle 110.

A tag may be about the size of a quarter or half-dollar, may have an integrated opening allowing for the tag to be added to a key ring, pet collar or other device, may have a short strap with a fastener to allow the user to attach the tag to the handle of an item and a low battery indicator along with an accelerometer to detect movement for the purpose of battery conservation. Each portable device 104a, 104b, 104c, 104d, whether wearable device or tag, may contain a remotely programmable/adjustable algorithm allowing for wake-up, transmission and sleep frequency intervals based on various situations. For example, if no movement is detected for a predetermined amount of time, the portable device may transition into a sleep mode but may be woken up (e.g., by being paged or detecting movement of the portable device) and transition into an active mode. In some embodiments, the system may determine the location of the portable device, register the location and send a sleep command to the portable device to sleep until movement is detected. In some embodiments, whether the sleep command is transmitted may be based on the location and/or the presence or absence of other portable devices in the same area. The portable device may accept the sleep command or may override the sleep command. During the sleep mode, the portable device may avoid performing any external network communication. If movement is detected, the portable device wakes up and audibly, visually, tactilely, and/or electronically pings (i.e., transmits the appropriate indication from the device) a predetermined number of times per minute and/or a predetermined number of times in total. If the portable device detects a BLE data reader, such as the plug-in reader, the ping may increase to a higher rate of times per minute or meet a predetermined set of conditions that are expected by the reader. If connectivity with a BLE data reader is lost, the portable device may return to the original predetermined number of times per minute check-in interval. In some embodiments, the portable device may wake up periodically even if no movement is detected, e.g., to determine the presence of readers or to otherwise communicate externally.

The amount of time without motion for the portable device to enter sleep mode and/or the time in which the portable device is in sleep mode may be predetermined (and no movement is detected) or may be dependent on a number of factors, such as location of the tag and to what object the portable device is attached. For example, if the tag location is designated as a known location, such as home, the portable device may wait for a shorter amount of time to enter sleep mode and/or persist in sleep mode for longer than if the portable device is disposed in an unknown location or a location in which the portable device expects to be moved more often. Similarly, a tag attached to an electronic device Dr more expensive item) may wait for a longer amount of time to enter sleep mode and/or enter sleep mode for shorter than if attached to a less expensive item. Similarly, the predetermined number of times per minute and/or in total that a portable device pings may be dependent on external factors, such as location and attached item type as well as internal factors, such as remaining battery life. In some embodiments, timing of the sleep mode may be dependent on a user profile stored in memory of the portable device. The accelerometer(s) may be used to determine the user profile of the user by determining based on user movement characteristics whether or not the user has been moving, which may be dependent on user characteristics such as age for example and setting one or more appropriate motion detection thresholds accordingly.

The plug-in or battery-powered readers 114 may be 110V and/or 220V readers. The plug-in readers 114 may be a data only device (i.e., interrogate devices and transmit only data to a cloud or other server) or may have two-way voice functionality as indicated below. The use of a plug-in reader 114 that is compatible with multiple formats permits a wide range of freedom in using portable devices in the system. An affirmation feature—visual and/or audible—may be incorporated into the plug-in readers 114 to signal proper connectivity with the network and each other, as well as indicating battery mode operation/low battery. The visual/audible signals may be uniform among different readers or may be different for the different information. The signals may, in some embodiments, be adjustable by a user. Additional plug-in devices may, on occasion, be added to an environment at a later date and/or plug-in devices may be removed, re-installed or re-positioned. Generally speaking, once installed, the plug-in devices may not expected to be removed or manipulated under normal circumstances in some embodiments. The reader 114 may include a rechargeable battery and a BLE and/or Wi-Fi radio that interacts with portable devices such as tags and smartphones. The reader 114 may, in some embodiments, be used in a vehicle (car, truck, etc.) In this case, the reader 114 may enter into charge mode when the engine is in operation and battery mode when the engine is off. The act of starting the engine, operating the engine and turning off the engine creates data points for the system relative to time and situation.

The portable devices 104a, 104b, 104c, 104d may be configured to communicate with the plug-in readers through Z-Wave, ZigBee, and/or Wi-Fi radios in addition to or instead of Bluetooth. The plug-in readers may have two-way voice functionality, again via BLE, Wi-Fi or ZigBee for example. The use of two-way voice functionality may allow for communication to occur from any room in the home 102 with, for example, a remotely-located central monitoring station of a PERS service. Plug-in readers without two-way voice functionality may be used as access points for data capture from the portable devices 104a, 104b, 104c, 104d. Each portable device 104a, 104b, 104c, 104d may include an identification that is used to interact with the environment and may be used to control the portable device 104a, 104b, 104c, 104d. The portable device 104a, 104b, 104c, 104d may operate in any of the environments as personalized triggers for programmed events and actions to occur with legacy home control equipment (e.g., security, access control, home automation, heating, ventilating, and air conditioning (HVAC), personal emergency reporting system irrigation control) and other legacy systems such as personal emergency reporting systems (PERS) solutions (sometimes referred to as personal emergency response system solutions). Each portable device 104a, 104b, 104c, 104d may be programmed to operate differently in different environments and set different triggers, thresholds or actions for the home control equipment via the reader 114 and home control panel 112.

In some embodiments, a user may register one or more of the information providers of the portable devices 104a, 104b, 104c, 104d through the network 116 with a registration server 130. The registration server 130 may be a dedicated server or a distributed server/cloud-based storage system such that information providers (as well as the information receivers) of the portable devices 104a, 104b, 104c, 104d are registered through cloud-based software. The registration server 130 may contain information including, for example, that related to the identification of the portable devices 104a, 104b, 104c, 104d, a schedule of a particular individual, animal, or object associated with the portable device 104a, 104b, 104c, 104d (as well as possibly the association itself), and an assignment of events and actions for the portable devices 104a, 104b, 104c. 104d when in particular locations. The events and actions may include notifications to others of the portable device 104a, 104b, 104c, 104d, or individuals through other mechanisms that are not part of the system (e.g., a laptop computer or automated telephone call to a work phone). The registration server 130 may thus contain, or be in communication with, an external database that provides associations of the various portable device 104a, 104b, 104c, 104d, as well as data about actions for various local devices and systems 108 to take dependent on which portable devices are detected by which readers 114 as well as non-interactive conditions, such as time or weather conditions.

The registration server 130 may also permit queries from registered devices or individuals regarding the status of individual portable devices 104a, 104b, 104c, 104d (e.g., whether a particular portable device has arrived at a predetermined location, the time of arrival, whether other portable devices have accompanied the particular portable device, etc. . . . —). To determine whether other portable devices have accompanied the particular portable device, the registration server 130 may compare arrival times of the other portable devices with that of the portable devices, concluding that the particular portable device and the other portable devices have accompanied the particular portable device when the arrival times are substantially identical, or within a short predetermined period (e.g. a few seconds). For example, the plug-in reader (which may have BLE, Z-Wave and Wi-Fi capabilities) may be queried for a status report (e.g., which portable devices have been detected in the area since the last query, as well as the time of detection, and perhaps other information). Such a status report may also be generated, for example, after a predetermined period of time, after a predetermined number of devices has been detected, or after one or more particular devices (or specific combination of) have been detected. The time, number or particular device(s) may depend on the time of day or week, for example such that, for example, during the day the plug-in reader may automatically report after 20 portable devices are detected while at night after only 1 or 2 portable devices are detected. The individuals or portable devices may be registered at any point prior to responding to the query such that only registered individuals or portable devices are able to obtain the desired information from the registration server 130. The registration server 130 may also permit access to only certain information, depending on limitations set by the registered owner of the system. For example, some individuals or devices may only be able to obtain information as to whether a particular portable devices 104a, 104b, 104c, 104d has arrived at a destination, while others may be able to obtain the time of arrival and manner of arrive e.g., from which registered vehicle or other conveyance). The registration server 130 may respond to any query containing a correct password, set by the system owner, for the portable devices 104a, 104b, 104c, 104d without using a previous registration.

The portable devices 104a, 104b, 104c, 104d may communicate directly with, or control via registration server 130 (i.e., indirectly control), the localized devices and/or systems 108. Note that although the localized devices and/or systems 108 are shown as being disposed in only the home 102, they may be in other environments, such as the vehicle 110 or the second environment 120. The localized devices and/or systems 108 may include, for example, devices and systems such as indoor and outdoor lighting, HVAC, music or seating positions. Specialized devices and systems, such as motorized dampers for personalized HVAC temperature control, pressure pads in a non-removable car seat (for car security for young children, and outdoor sensors to extend the security zone for pets, wandering kids/seniors and car security.

In some embodiments, the plug-in readers 114 may be installed in electrical wall sockets near common entrances and exits within the home 102. The plug-in readers 114 may also be installed on different floors or areas in the home 102 such as the upstairs, basement, and garage. The plug-in readers 114 may, as above, have a unique identification and be used to signal the registration server 130 when in communication with the portable devices 104a, 104b, 104c, 104d. The plug-in readers 114 may be used to activate various mechanisms of the localized devices and/or systems 108 through the panel 112. As above, the plug-in readers 114 may be used in the vehicle 110 and the second environment 120.

In operation, a primary user or system owner may access software to assign each of the portable devices 104a, 104b, 104c, 104d to the members of a household and tags to what the user deems as important items (possessions or pets) and that are transported in and out of the house 102 as part of the household's daily or weekly routine. The software may be stored in tangible memory in one of the portable devices 104a, 104b, 104c, 104d or in an entirely different device, such as a laptop computer. Individual and group preferences and related actions, schedules of the individuals and reminders may be stored for some or all of the portable devices 104a, 104b, 104c, 104d. In one particular embodiment, the user may store this and other information regarding a wearable sensor and/or a tag assigned to different individuals or items.

In one example implementation, a plug-in reader 114 in the particular environment (e.g., home, vehicle) recognizes one or more tags and interfaces with a cloud-based system via the huh to determine the appropriate action. The appropriate pre-programed action may be based on timing and/or combination of portable devices present. The timing may include the day of the week, the time of day, season, or month. The combination of portable devices may include the presence or absence of a specific user, a specific portable device or a specific combination of users or portable devices. For example, a vehicle detecting multiple tags may act differently than if only one tag is detected, with specific examples provided below. In further embodiments, one or more of the portable devices may contain sensors such as accelerometers, gyroscopes, bodily monitors (e.g. heartrate or blood pressure monitor). Measurements taken by such sensors may in addition be provided to the plug-in reader or other device and may be used to determine the appropriate action.

In some embodiments, a security backend 140 may also be connected to the panel 112. The security backend 140 may ensure that actions taken in response to the presence of one or more of the portable devices complies with safety protocols. For example, the security backend 140 may be responsible for determining whether access to a particular portal should be granted by the panel 112 or reader 114.

Figure 2:
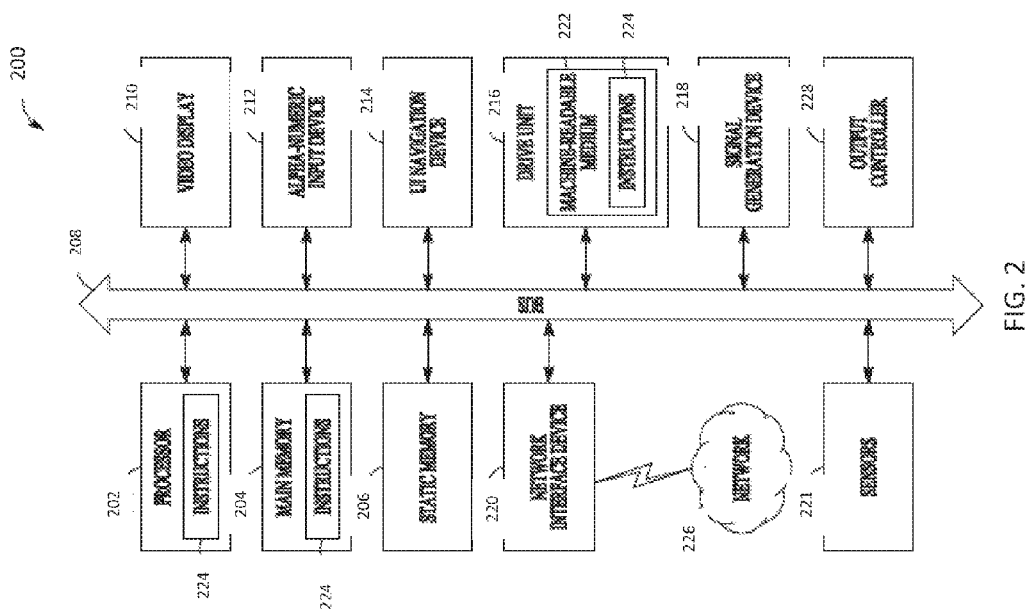
FIG. 2 illustrates a portable device in accordance with some embodiments.

FIG. 2 illustrates a block diagram of a portable device in accordance with some embodiments. The portable device may or may not contain all of the modules described herein. In some embodiments the machine may be a computer configured to perform any one or more of the techniques discussed herein. As indicated above, the portable device 200 may be a laptop computer, a tablet PC, a personal digital assistant (PDA), a mobile telephone, a smart phone, a tag, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits in a specified manner as a module. In an example, one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Portable device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. Although not shown, the main memory 204 may contain any or all of removable storage and non-removable storage, volatile memory or non-volatile memory. The portable device 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The portable device 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The portable device 200 may include an output controller 228, such as a serial, (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the portable device 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the portable device 200 and that cause the portable device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226.

Figure 3:
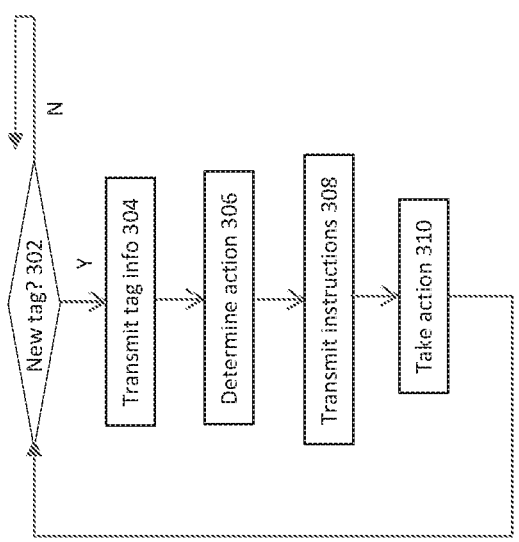
FIG. 3 illustrates a flowchart of a method of using a portable device in accordance with some embodiments.

FIG. 3 illustrates a flowchart of a method of using a personal device in accordance with some embodiments. The plug-in reader determines at operation 302 whether information of a new tag has been received. When tag information has been received, at operation 304, the plug-in reader transmits the tag information, along with its own information and perhaps time, date and other relevant location to the server/cloud-based storage system. The server at operation 306 determines the appropriate action to take due to the presence of the new tag in the location and at operation 308 transmits instructions to the plug-in reader or other connected device in the environment in which the tag is located. The server may also notify a desired set of individuals or devices of arrival of the tag at the location and/or actions taken in response to the arrival. At operation 310, the indicated actions are taken by the device(s) or system(s) in the local environment of the tag.

Some examples of the method of FIG. 3 are provided. Wearable devices are assigned to different individuals, tags are assigned to an infant but attached to a removable car seat, attached to a key chain of one of the individuals, a pet (and attached to the pet collar), gym bags, a lunchbox, an instrument case, a diaper bag, a professional caregiver of various ones of the individuals and recyclable grocery bags. An ideal temperature or preferred temperature range is entered to the database for each member of the household with the possibility of assigning individual preferences for daytime and nighttime. The portable devices may be associated with different individuals. A. "compromise" temperature or temperature range is assigned for a group (two or more people) or specific combinations of individuals, as identified by the portable devices, either through direct data entry or through calculation, the former of which may take precedence. Alternatively, the portable devices may store temperature preferences to permit averaging or normalization when a group of portable devices is present in the same location (within a predetermined range) and is registered with the registration server. This information may then be provided to a registration server, e.g., through the plug-in reader, where such compromises may be calculated and provided to the temperature controller. For unregistered portable devices, or portable devices that do not have a temperature associated, an average temperature may be used in the calculation, or these devices may be ignored. This may be extended such that the portable devices may store information other than temperature and that is amenable to quantization and statistical manipulation and may be used, for example, in averaging or normalization for a group of portable devices is present in the same location (within a predetermined range) to determine an acceptable value composite value. The values used may thus depend on portable devices present as well as external factors, such as time of day.

The registration server may also determine whether a user associated with the portable device is present prior to taking the adjustment into account. For example, if another portable device indicates that the user is in a different location, as determined by recent plug-in reader activation in that location, the registration server may turn to another portable device associated with the user to determine which location is correct. If no other portable device is present, the central server may use other conditions, such as time of day/day of week, recent portable device use (perhaps versus historical portable device use), and/or recent movement to make the determination. In the last case, the registration server may retain a history or may have had entered a route between different locations such that the user may be identified when either a portable device may be associated with multiple users by a route taken between locations (or presence in a particular location) or that the associated user may be determined by the route.

The plug-in readers located throughout the home (e.g., basement, main floor and upstairs) detect the presence (or absence) of each member of the household and adjust the temperature accordingly throughout the day/night as a result of thermostats located on each level of the home and motorized dampers installed at the primary ducts to each level of the home. The thermostats and motorized dampers may be controlled separately dependent on the stored preferences. In some embodiments, the localization may be relatively small, e.g., within the same room, while in other embodiments the localization may be larger, e.g., within the same floor. The localization itself, that is, the distance that is used to determine whether or not different users are in proximity, may change with time of day or other external factors.

Similarly, regarding security, each personalized device may be configured to act as an electronic key to arm/disarm a security system (or a specific part of the security system) based on presence either as an independent, stand-alone solution or in conjunction with the presence of a recognized smart phone or other action such as an abbreviated arm/disarm sequence. This may include arming the security system automatically when the last person leaves the home in the morning but automatically disarming it if a specific one of the individuals having a portable device comes to the main floor, e.g., to let the pet in or out, and rearming the system automatically when that same individual later passes by the plug-in sensor located in the specific dwelling area of the individual. Similarly, the presence of multiple portable devices may trigger different arming or disarming of the security system, e.g., unlocking (or requiring a shortened access code) a particular door if only one portable device is present but unlocking a different door or the particular door and another door if a combination of portable devices associated with different individuals are present.

In some embodiments, the system checks with, or is sent instructions periodically by, the server (which has a schedule or history of individual interaction) such that the home may expect a particular individual to arrive home at a particular time of day on specific days. In this case, the time/day may be used for security and home automation control such that the presence of a portable device associated with the expected individual detected at or near the front door in this time frame may trigger the security system to automatically disarm the security system and/or set the climate inside the house (e.g., HVAC, turn up the water heater from idle). For added security, the system could be configured to require additional actions (i.e. key pad entry only) by the individual if the presence is detected at the front door at a different time of day (e.g., late at night or early in the morning).

In a similar vein, a garage door opener may be configured to operate based on the recognition of the presence of the personalized wearable device of one of the individuals, a tag assigned to the vehicle, a recognized smartphone, or a combination of these, when the car is in operation. Whether the car is in operation may be determined by the plug-in reader such as a USB cigarette lighter adaptor/BLE radio and in range of the garage door opener.

As is clear from the above, the overall system may be configured to require one, multiple or a specific combinations of portable device credentials depending upon the day, time and/or the presence (or lack of presence) of other portable devices or other conditions including the operational status of sub-systems (e.g., an alarm panel) associated with the system. Responsibility for this security may be provided by the security backend and/or the registration server. In addition, for added security, the system may be further configured to require wireless connectivity via specific pathways or a combination of specific pathways for a desired action to occur. For example, a tag may be required to communicate with a particular plug-in reader and to a particular smartphone, and the smartphone may be required to be connected to a router (which is in communication with the registration database or security backend via the internal and external network). Continuing with this example, the action taken may be simultaneous or sequential WAN and LAN connectivity from specific devices as determined and programmed by the system administrator (owner of the system). The specific devices may be devices other than the tag and smartphone. This permits a higher level of security at certain times of the day and/or with certain users by requiring specific credentials to be present. As an example, a teenager returning late at night could be required to be standing at the door with his/her smartphone (Wi-Fi to router) and tag (BLE to router or BLE to tag) in order for the electronic lock on the front door to operate—i.e., two credentials transmitting via specified wireless pathways. Alternately, the system may be configured such that after midnight the teenager may be required to be at the front door in order to establish a tag-to-reader connection and, in addition, enter a code via the smartphone (phone-to-cloud-to-system). In some embodiments, different actions may be taken by the system dependent on the manner of connection, e.g., one action being taken if the portable device is connected via only one pathway and a different action being taken if the portable device is connected via multiple pathways. Similarly, a combination of portable devices and communication pathways may be used to determine the action taken. In sum, in addition to a tag or a combination of tags being present for an action to occur, wireless communication pathways could also be specified and, in so doing, creating a higher level of security.

In another example, a tag attached to a removable car seat may permit a reduction in issues involving the car seat. For example, the USB cigarette lighter adaptor device may detect the presence of one or more individuals in the vehicle in addition to the tag and the fact that the vehicle is in operation. A smartphone application, in conjunction with the USB cigarette lighter adaptor device, monitors the presence of the tag relative to the distance between the individual(s) and initiates a localized warning alert in the event of a threshold distance (such as several feet or outside the range of the reader) between the tag and the individual being exceeded. The smartphone may place an outbound call or otherwise alert the user when the BLE signal between the USB cigarette lighter adaptor device and smartphone is broken. A pressure pad may also be incorporated into this system for young children who use a non-removable car seat. Similarly, a portable device assigned to a young child may also be used in conjunction with the USB cigarette lighter adaptor device. The USB cigarette lighter adaptor device may detect the presence of the child's portable device and the absence of an adult wearable, and rather than immediately, after a specified length of time such as one or two minutes, initiate a wireless alert to a sensor located, for example, near the car or in the home. The sensor, in turn, may be linked to the home security system. Moreover, in the event a non-authorized user (having a portable device) accesses and starts the vehicle when the vehicle is proximate to the garage and no authorized user (having a portable device) is present, the system may be configured to send an alert from the USB car cigarette lighter adaptor device to the home security system and/or smartphone of one of the authorized individuals.

In some embodiments, the portable device are scheduled such that the system recognizes that the presence or absence of a particular portable device may cause a specific action to be taken. For example, an instrument may be scheduled to be in the vehicle for morning (to school/lesson) and afternoon (from school/lesson) on particular school days, while a lunchbox may be scheduled for morning and afternoon each school day. In this case, an alert may be triggered when the vehicle is in operation by an authorized individual (i.e., the presence of the individual's wearable device is detected) and is either within range of the security system or leaves the range of the security system and either a lunchbox tag is determined to be absent from the vehicle on any school day or an instrument tag is determined to be absent on the specific school days. The alert may be generated on the authorized operator's smartphone, a smartphone associated with the missing tag individual, or another individual in the home. The alert may be audible, tactile, and/or visual.

In another example, lighting in particular rooms can be activated, dimmed or turned off dependent on detection by a plug-in of the presence or absence of a particular individual having a portable device within a predetermined time in a particular area. For example, detection of the presence of the individual within a particular time frame may cause the lighting to dim, while in other time frames does not affect the lighting.

In another example, as above multiple plug-ins in different rooms, each having a limited range, may enable tracking of the movement of a particular individual (via portable device detection) and provide statistical information to the cloud server about the activity level of the individual. Monitoring of the activity level may generate an alert if an expected activity level or activity itself does not match a predetermined pattern. For example, no trip to (or excessive trips to) a restroom or kitchen within a predetermined amount of time may trigger an alert. The system may also be configured to generate either a local alarm or outbound text message/call if the individual leaves the home or, for example, tries to go to an unauthorized area. If the individual is elderly and a portable device is given to a caregiver, the portable device may log the caregiver's arrival and departure times, and the system may correspondingly grant access to all or a limited portion of the home to the caregiver. The limited areas may, of course, change at different time periods such that if the caregiver is present at an unauthorized time, no access may be provided to the caregiver unless an emergency situation is detected that overrides the system.

In circumstances in which the caregiver is not present, the system may detect whether the elderly individual has placed an associated smart phone in a charging cradle and a subsequent emergency event is detected by a PERS device while the smartphone is inaccessible to the elderly individual. The emergency alert may be routed by the system from a pendant-style PERS transmitter to the nearest plug-in reader to the smartphone, where an outbound communication occurs and a two-way voice communication is established with the central monitoring station (CMS) via the plug-in reader.

Tracking of the various activities and amount of time the individuals are spending at home, are alone in different rooms or are together may be used by the system to determine (and perhaps display) traffic patterns. This may allow the system to automatically generate or authorized user to determine furniture rearrangement. For example, if the system detects the presence of portable devices in a high traffic area that does not record the presence of the associated users of the instruments in the same area, the system may suggest moving the instruments (and accessories) to a lower traffic area. Similarly, the system may provide feedback to an individual having a home office as to the amount of time and when each family member is spending in a particular area and adjust a work schedule accordingly.

In another example, the system may detect the presence of children (with whom a portable device is associated) along with the absence of adults and notify parents regarding activities of the children in the home. An extended time period in a den with a large screen television during certain hours may result in the system notifying the parents and/or cutting power to the television. Similarly, the absence of children expected to arrive at a particular scheduled time may generate an alert. The alert (and original schedule) may be overridden if, for example, the system determines that the children are in a vehicle with one of the parents.

A similar embodiment may be applied to pets. A tag on a pet collar may be used to track movement of an animal through the home as well as time spent in and outside the home (if a pet door is installed). Alerts may be generated to any individual of the family if for example, a dog was not let out in the afternoon or, perhaps, if it spent an abnormal amount of time outside or perhaps left a geo-fenced area. The alert to a particular individual may be generated by detection of the individual arriving at the home when a pet issue has arisen. The pet tag may also be used in the same manner as the above car seat—i.e., the tag remaining in the vehicle without a wearable device within the vicinity generates an alert.

In some embodiment, the system may be used for energy management. For example, a predetermined scheduled set of thermostat settings may be automatically modified and adjusted within different zones in the home dependent on the presence or absence of individuals as determined by the detected presence or absence of the wearable devices/tags associated with the individuals. Thus, even though the thermostat may be set to a particular temperature that is automatically adjusted at a particular time, the adjustment may be overridden by the absence of individuals at that time to save energy. If the system determines that the individuals are returning, either by GPS or another location technology estimating the arrival of the individuals or by proximity to sensors in the home, the system may return the thermostat to the original settings. The determination of whether or not to adjust the thermostat may be based on a combination of detected individuals and the negotiated temperature between the individuals. Similarly, the system may be scheduled to automatically turn off unnecessary lights when individuals are not in a particular room. The system may be personalized to allow a minimal amount of lighting to remain in an unoccupied room when certain individuals are alone in the home but programmed to turn off all lights in unoccupied rooms if other individuals are in the home. For home security purposes, one light in a particular room may be generally turned on and remain on during a particular time period, but remain on if the absence of a particular individual in the entire home is determined.

As above, the portable device may be a smartphone that uses any operating system, such as Android or iOS. The application may provide a number of abilities. These abilities include the ability to generate an outbound alert in the event of the distance between the device and the phone reaches a predetermined threshold (e.g., more than about 10 feet (low RF signal), the ability to interact with the dual USB car cigarette lighter adaptor device and cloud based database of items, time and rules, the ability to auto-generate an audible alert, the ability for the user to cancel an audible alert, the ability for an alert cancellation by a user to be logged in the cloud based software, the ability to wireless connect and operate with wearable devices, tags and readers, the ability to select user generated identifiers that are configured to the system (i.e. garage door, HVAC, lights, etc. and enter manual commands ("open/close", "on/off", "home/away", etc.), and the ability to receive low battery alerts and system operating status, among others.

The cloud based software may provide a user portal and permit the user to register the smartphones, wearable devices, tags and readers, schedule and/or assign events and actions, interface and manage legacy systems, notify others (e.g., send messages), query smartphones and plugins for status, modify check-in and sleep frequencies of wearable devices and tags based on user needs, provide manual system configuration as well as an automatic set-up wizard and provide a low battery warning indicator and identification of wearable devices and tags.

In some embodiments, a proximity based geo-fence/location system (non-GPS, non-WAN/triangulation, etc.) may permit tracking and connecting potentially multiple smartphones and BT/BLE wearable devices with other systems, sub-systems and wireless protocols (GPS, WAN, routers, mobile/fixed electronics, security panels, home automation, GDOs, etc. to trigger pre-determined actions. The system may provide the ability to associate a smartphone or BT/BLE tag with a user and assign preferences and/or actions to occur in accordance with a list of eligible legacy systems, available options, time of day, day of the week, and presence status of other smart phones and/or tags. A centralized storage, application and manipulation of user preferences, presence status and associated actions may be provided for one or more users (tags, smart phones, etc.) with distributed inputs, outputs and various degrees of intelligence located throughout the connecting systems and sub-systems of the overall system. A single solution platform may allow for presence-based asset tracking, home automation and personalization triggers to occur in both fixed (home/commercial) and mobile (car/smart phone) environments. The system may provide the ability to modulate the data readers in order to customize the coverage area of a given wireless zone. In this case, the installation of more readers operating in lower power may provide a greater degree of, as an example, room-by-room actions to occur and a fewer number of readers operating with higher power may reduce the granularity of presence based triggers to, as an example, "home or away" or perhaps "upstairs or downstairs." The data readers may be able to operate as a mesh network—for example, they may be able to report the presence of portable devices (or particular portable devices to each other to track device movement or provide other services, while generating a status report as above. The modular data readers (data and voice and data readers) may have multiple radios allowing for wireless connectivity with various systems and sub-systems. The use of plug-in readers may result in easy installation (no wires) and a high degree of flexibility for coverage expansion or reduction. The use of a car cigarette lighter adaptor with rechargeable batteries and BLE radio (or USB connector dongle with identical functionality) may permit interaction with a smartphone and tags to create a system for presence and status in a vehicle (engine is on/off, active/sleep mode, smart phone-to-beacon distance vs. tag-to-beacon distance, etc.). The system may allow for a high degree of automation and personalization to occur and, as such, represents a significant step forward for the home automation market. The system may provide the ability to track people, pets and things to and from the home, vehicle and smart phone is an expansion on traditional wireless asset tracking systems. It should be clear that in the various embodiments described, a smartphone may operate as either or both a tag or reader (of tags).

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Some embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individual and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and some embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc, are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising: a plurality of plug-in readers configured to be disposed in different environments including residential, vehicular, and commercial environments associated with a predetermined set of individuals and objects; a plurality of portable devices including wearable devices, tags, and smartphones, the portable devices associated with the individuals and objects and configured to be detectable by the plug-in readers; and a storage device remote from the environments and configured to store actions and triggers associated with presence or absence of predetermined combinations of the portable devices, a stored schedule for users of the portable devices, user actions that are not associated with the portable devices and that are taken by users of the portable devices, communication pathways used by the portable devices, and state of the environment in which the portable devices are disposed, the actions including security, environmental controls, and transmission to a portable device associated with at least one of the individuals.

2. The system of claim 1, wherein: the portable device is configured to trigger an action taken by home control equipment including at least one of access control, home automation, heating, ventilating, and air conditioning (HVAC), and irrigation control, the action is taken in response to the presence of a combination of a first and second portable device in an area detected by a particular reader, and the action taken is a modification of an action that would have been taken in response to the presence of the first portable device in the area and absence of the second portable device in the area.

3. The system of claim 2, wherein:
the modification comprises averaging or normalization of quantifiable preferences associated with the portable devices.

4. The system of claim 3, wherein:
the modification is further dependent on at least one of time of day and external temperature.

5. The system of claim 3, wherein:
the action taken is dependent on use by the first and second portable devices of different communication pathways with different equipment in the home, one of which is the particular reader.

6. The system of claim 1, wherein:
the portable device is configured to trigger an action taken by home control equipment including at least one of access control, home automation, heating, ventilating, and air conditioning (HVAC), and irrigation control,
the action is taken in response to the presence of a first portable device in an area detected by a particular reader and an indication that a second portable device is to enter the area detected by the particular reader within a predetermined amount of time and
the action is modified from an action that would have been taken in response to the presence of the first portable device without the indication.

7. The system of claim 1, wherein:
a particular reader is disposed in a particular vehicle, the particular reader is powered by a motor of the vehicle when the motor is on and is powered by an internal battery when the motor is off, and
the system is configured to trigger an action that is dependent on whether the motor is on in response to the presence of a first portable device in an area detected by the particular reader.

8. The system of claim 7, wherein:
the action taken is modified dependent on whether a second portable device associated with the first portable device is present in the area detected by the particular reader.

9. The system of claim 8, wherein: the first portable device is a tag associated with a child car seat, the second portable device is a smartphone or wearable device, and the action taken, when the motor is off, is a local alert in the event of a threshold distance between the tag and the second portable device being exceeded as determined by the particular reader or second portable device, the action being avoided when the motor is on.

10. The system of claim 9, wherein: rather than the action being taken immediately, the action is taken a specified length of time after the threshold distance has been exceeded.

11. The system of claim 1, wherein: a particular portable device is configured to enter a sleep state when no movement of the particular portable device is detected for a predetermined amount of time, and upon waking up from the sleep state in response to detecting movement, the particular portable device is configured to ping at an adjustable rate dependent on at least one of whether a reader is present, a geographic location of the particular portable device or with what the particular portable device is associated.

12. A method of providing an automation and personalization platform, the method comprising: detecting at least one portable device using at least one plug-in reader disposed in residential, vehicular, and commercial environments and configured to communicate with the at least one portable device via short-range communication, the at least one portable device including a wearable device or tag and associated with an individual or object; and determining an action to be taken dependent on presence or absence of predetermined combinations of portable devices including the at least one portable device, a stored schedule associated with the at least one portable device, actions that are not associated with the at least one portable device and are taken by users of the at least one portable device portable device, communication pathways used by the portable devices, and state of the environment in which the portable devices are disposed, the action including security and environmental controls; and communicating with a system associated with the at least one portable device to take the action.

13. The method of claim 12, further comprising:
determining the presence of a combination of a first and second portable device in an area detected by a particular reader; and
modifying a first action, which would have been taken in response to the presence of the first portable device and absence of the second portable device in the area, to a second action in response to the detection, the first and second action taken by home control equipment that includes at least one of access control, home automation, heating, ventilating, and air conditioning (HVAC), and irrigation control.

14. The method of claim 13, further comprising at least one of: modifying the first action by averaging or normalizing quantifiable preferences associated with the first and second portable devices, or determining the presence of the first and second portable devices through a first communication pathway to the particular reader used by the first portable device and a second communication pathway, to equipment in the home different than the particular reader, used by the second portable device and modifying the first action in response to use by the first and second portable devices of the different communication pathways.

15. The method of claim 12, further comprising:
determining the presence of a first portable device in an area detected by a particular reader;
determining that a second portable device is to enter the area within a predetermined amount of time; and
modifying a first action, which would have been taken in response to the presence of the first portable device and absence of entry of the second portable device in the area within the predetermined amount of time, to a second action in response to the detection, the first and second action taken by home control equipment that includes at least one of access control, home automation, heating, ventilating, and air conditioning (HVAC), and irrigation control.

16. The method of claim 12, wherein: a particular reader is disposed in a particular vehicle, the particular reader is powered by a motor of the vehicle when the motor is on and is powered by an internal battery when the engine motor is off, and the method further comprises: determining the presence of a first portable device in an area detected by the particular reader, and determining an action to be taken dependent on whether the motor is on in response to the determination.

17. The method of claim 16, further comprising:
determining the presence of a second portable device associated with the first portable device in the area; and
modifying the action to be taken from an action to be taken in response to the presence of the first portable device and absence of the second portable device in the area to a different action in response to determining the presence of the second portable device in the area.

18. The method of claim 17, wherein: the first portable device is a tag associated with a child car seat, the second portable device is a smartphone or wearable device, and the action taken, when the motor is off, is a local alert in the event of a threshold distance between the tag and the second portable device being exceeded as determined by the particular reader or second portable device, the action being avoided when the motor is on.

19. The method of claim 12, further comprising:
determining a location of a particular portable device;
registering the location for use in a determination of a subsequent action to take; and
transmitting a sleep command to the particular portable device in response to registration of the location, the sleep command instructing the particular portable device to sleep until movement of the particular portable device is detected.

20. The method of claim 19, wherein:
transmission of the sleep command permits power usage regulation by the particular portable device, and
the method further comprises detecting movement of the particular portable device using an accelerometer in the particular portable device and entering an active mode in response to movement detection.

\* \* \* \* \*